United States Patent [19]
Horiuchi et al.

[11] Patent Number: 5,456,238
[45] Date of Patent: Oct. 10, 1995

[54] EVAPORATIVE FUEL PROCESSING DEVICE

[75] Inventors: Masaaki Horiuchi; Takeaki Nakajima, both of Wako, Japan

[73] Assignee: Honda Giken Kogyo Kabushiki Kaisha, Tokyo, Japan

[21] Appl. No.: 326,964

[22] Filed: Oct. 21, 1994

[30] Foreign Application Priority Data

Oct. 22, 1993 [JP] Japan .................................. 5-264923

[51] Int. Cl.$^6$ ............................ F02M 33/02; B65B 31/00
[52] U.S. Cl. ...................... 123/520; 141/59; 137/587
[58] Field of Search ........................... 123/516, 520, 123/521, 518, 519, 198 D; 141/59, 60, 61; 220/DIG. 27, DIG. 33; 137/587, 588, 118

[56] References Cited

U.S. PATENT DOCUMENTS

| | | | |
|---|---|---|---|
| 4,714,172 | 12/1987 | Morris | 220/DIG. 33 |
| 4,724,861 | 2/1988 | Covert | 141/59 |
| 4,862,856 | 9/1989 | Yokoe | 123/520 |
| 4,881,578 | 11/1989 | Rich | 141/59 |
| 5,014,742 | 5/1991 | Covert | 141/59 |
| 5,099,880 | 3/1992 | Szlaga | 123/519 |
| 5,111,795 | 5/1992 | Thompson | 123/520 |
| 5,259,355 | 11/1993 | Nakashima | 123/520 |
| 5,271,438 | 12/1993 | Griffin | 141/59 |

FOREIGN PATENT DOCUMENTS 0194936  8/1987  Japan .................................. 123/519

*Primary Examiner*—Carl S. Miller
*Attorney, Agent, or Firm*—Nikaido, Marmelstein, Murray & Oram

[57] ABSTRACT

In an evaporative fuel processing device, a constriction is provided in a refueling line 1 for a fuel tank T and connected to a diaphragm actuator through a negative pressure tube. When fuel passes through the constriction during refueling, the diaphragm actuator causes a switch-over valve 5 to be switched by the action of a negative pressure generated at the constriction, thereby permitting an evaporative fuel generated in the fuel tank to be introduced into a canister used during refueling. During normal operation which is other than the time of refueling, the negative pressure disappears and hence, the switch-over valve is switched, thereby permitting the evaporative fuel to be introduced into a canister used during normal operation. Thus, it is possible to reliably collect the evaporative fuel generated during refueling into the fuel tank by a simple structure.

20 Claims, 3 Drawing Sheets

5,456,238

EVAPORATIVE FUEL PROCESSING DEVICE

BACKGROUND OF THE INVENTION

1. Field of the Invention

The present invention relates to an evaporative fuel processing device for collecting evaporative fuel, generated within a fuel tank in a vehicle, by means of a canister to prevent the evaporative fuel from being released into the atmosphere.

2. Description of the Prior Art

The amount of evaporative fuel generated in a fuel tank in a vehicle during refueling is larger than that of evaporative fuel generated during normal operation (i.e., during parking and traveling of the vehicle). Therefore, it is necessary to reliably introduce the evaporative fuel generated during refueling into a canister, thereby preventing it from being released into the atmosphere. An evaporative fuel processing device is conventionally known which is intended to collect evaporative fuel generated during refueling in this manner, and which is described in Japanese Utility Model Publication No. 37006/93.

The above prior art evaporative fuel processing device includes an on-off valve provided in an intermediate portion of a charge passage, which connects an upper space in the fuel tank and the canister, so that the on-off valve is opened upon insertion of a refueling nozzle into a refueling line (pipe) during refueling of the fuel tank, thereby permitting the evaporative fuel generated during refueling to be guided into the canister. In order to prevent the fuel from flowing through the charge passage into the canister, a float valve is also mounted at a lower end of the charge passage which opens into the fuel tank.

However, a problem with the above prior art evaporative fuel processing device is that the number of parts is increased which increases the cost due to the need for both a) the on-off valve opened by the insertion of the refueling nozzle and b) the float valve closed by rising of the liquid level in the fuel tank.

SUMMARY OF THE INVENTION

Accordingly, it is an object of the present invention to provide an evaporative fuel processing device wherein evaporative fuel generated in the fuel tank during refueling can be easily and reliably introduced into the canister.

To achieve the above object, according to a first aspect and feature of the present invention, there is provided an evaporative fuel processing device comprising a fuel tank, a refueling line connected to the fuel tank, a breather tube connecting an upper space in the fuel tank to an upper end of the refueling line for defining the upper limit of the fuel liquid level within the fuel tank, a construction provided in the refueling line, a canister for adsorbing an evaporative fuel generated in the fuel tank, a charge passage connecting the upper space in the fuel tank to the canister, an on-off valve for opening and closing the charge passage, and a control device connected to the constriction for opening and closing the on-off valve in accordance with a negative pressure generated at the constriction.

With the first feature, the on-off valve connected to the canister is opened on the basis of the negative pressure generated at the constriction in the refueling line during refueling from the refueling nozzle, and therefore, the evaporative fuel generated during refueling can reliably be introduced into the canister and thereby prevented from being released into the atmosphere. Moreover, the definition of the upper limit of the fuel liquid level in the fuel tank is performed by the breather tube and therefore, the float valve required in the prior art is not required, leading to a reduced number of parts.

In addition, according to a second aspect and feature of the present invention, there is provide an evaporative fuel processing device comprising a fuel tank, a refueling line connected to the fuel tank, a breather tube connecting an upper space in the fuel tank to an upper end of the refueling line for defining the upper limit of the fuel liquid level within the fuel tank, a constriction provided in the refueling line, a canister used during refueling and a canister used during normal operation for adsorbing an evaporative fuel generated in the fuel tank, a first charge passage connected to the canister used during refueling, a second charge passage connected to the canister used during normal operation, a switch-over valve which permits an upper space in the fuel tank to selectively communicate with the first charge passage or the second charge passage, and a control device connected to the constriction for switching the switch-over valve in accordance with a negative pressure generated at the constriction.

With the second feature, in addition to an effect of the first feature, the evaporative fuel generated during refueling can be introduced into the canister used during refueling, and the evaporative fuel generated during normal operation can be introduced into the canister used during the normal operation. Therefore, the evaporative fuel can be effectively collected in accordance with the amount and components thereof.

The above and other objects, features and advantages of the invention will become apparent from the following description of preferred embodiments taken in conjunction with the accompanying drawings.

DESCRIPTION OF THE PREFERRED EMBODIMENTS

The present invention will now be described by way of embodiments in connection with the accompanying drawings.

Figure 1:
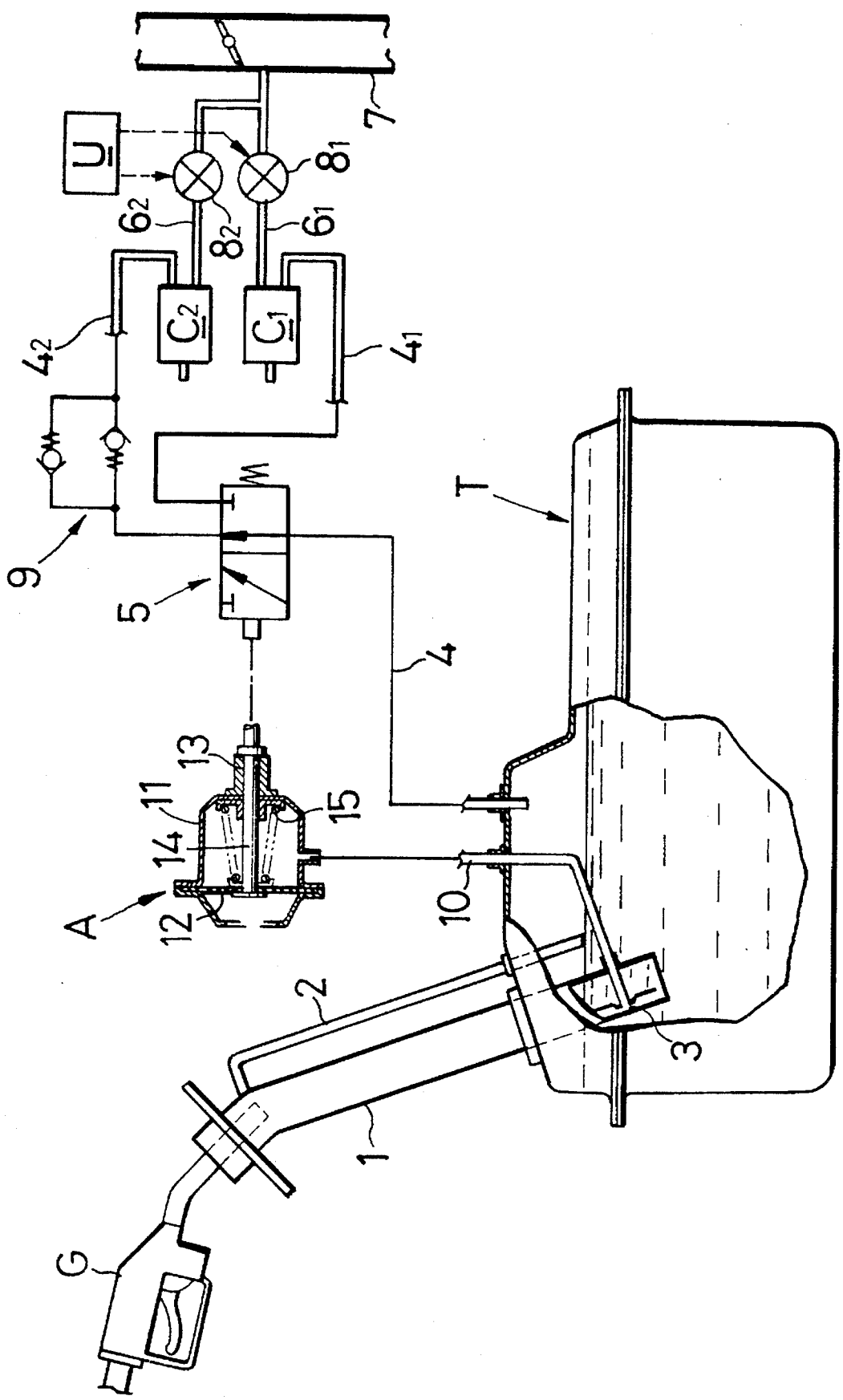
FIG. 1 is a diagrammatic illustration of the entire arrangement of an evaporative fuel processing device according to a first embodiment of the present invention.

Referring to FIG. 1 illustrating a first embodiment of the present invention, a fuel tank T mounted in a vehicle includes a refueling line 1 into which a refueling nozzle G is inserted. A breather tube 2 opens at its lower end into an upper space in the fuel tank T and is connected at its upper end to a portion of the refueling line 1 near a fuel introducing port. The refueling line 1 has a constriction 3 provided at its lower end. The level of the constriction 3 is set at a location slightly lower than the lower end of the breather tube 2, which defines a fuel liquid level when the tank is fully filled up. The specified structure of the constriction 3 is such that a flow path in the refueling line 1 is vertically partitioned by a partition wall, with a lower flow path portion having a partially decreased sectional area.

A charge passage 4 extends from a location higher than the lower end of the breather tube 2 in the upper space in the fuel tank T, and is branched through a switch-over valve 5 into a first charge passage $4_1$ and a second charge passage $4_2$. The first charge passage $4_1$ is connected to a canister $C_1$ used during refueling, while the second charge passage $4_1$ is connected to a canister $C_2$ used during normal operation.

The amount of evaporative fuel generated during refueling is larger than the amount of evaporative fuel generated during normal operation and hence, the capacity of the canister $C_1$ used during refueling is set to be larger than the capacity of the normally used canister $C_2$. The evaporative fuel generated during refueling contains a large amount of high boiling point components, and the evaporative fuel generated during normal operation contains a large amount of low boiling point components. Therefore, adsorbents suitable for adsorption of the high and low boiling point components are selected respectively for use in the canister $C_1$ used during refueling and the canister $C_2$ used during normal operation.

The canisters $C_1$ and $C_2$ are connected to an intake passage 7 of an engine (not shown) through a first purge passage $6_1$ and a second purge passage $6_2$, respectively. A first purge valve $8_1$ and a second purge valve $8_2$ are incorporated in the first and second purge passages $6_1$ and $6_2$, respectively, and connected to and controlled for opening and closing by an electronic control unit U.

A negative pressure tube 10 having one end opening into the constriction 3 of the refueling line 1 is connected at the other end thereof to a diaphragm actuator A serving as a control means for switching the switch-over valve 5. The diaphragm actuator A includes a cup-like casing 11, a diaphragm 12 spread on an opened surface of the casing 11, a rod 14 which is slidably carried in a guide member 13 mounted on a bottom wall of the casing 11 and which is connected to the center of the diaphragm 12, and a spring 15 mounted under compression between the bottom wall of the casing 11 and the diaphragm 12. The other end of the negative pressure tube 10 opens into a space defined by the casing 11 and the diaphragm 12. The rod 14 of the diaphragm actuator A is mechanically connected to the switch-over valve 5.

The operation of the first embodiment having the above-described construction will be described below.

When fuel is being fed into the fuel tank through the refueling nozzle G inserted into the fuel introducing port in the refueling line 1, a negative pressure is generated in the constriction 3 provided in the refueling line 1, due to the fuel passing through the constriction 3. If this negative pressure is transmitted through the negative pressure tube 10 into an interior of the diaphragm actuator A, the diaphragm 12 is deformed under atmospheric pressure to push the rod 14, thereby switching the switch-over valve 5 connected to the rod 14 from a left position shown in FIG. 1 to a right position. As a result, the evaporative fuel generated in the fuel tank T during refueling is charged through the switch-over valve 5 and the first charge passage $4_1$ to the canister $C_1$.

When the fuel liquid level in the fuel tank T reaches the level of the constriction 3, the flow speed of the fuel passing through the constriction 3 is rapidly reduced, so that the negative pressure disappears to cause the rod 14 of the diaphragm actuator A to retreat to its original position, thereby switching the switch-over valve 5 to the left position shown. Thus, the internal space in the fuel tank T is disconnected from the canister $C_1$ used during refueling and connected to the canister $C_2$ used during normal operation.

If the fuel liquid level in the fuel tank T reaches the lower end of the breather tube 2 with a slight time lag after switching of the switch-over valve 5, the fuel liquid level in the fuel tank T cannot rise any more, and the fuel liquid level in the refueling line 1 rises suddenly. If the tip end of the refueling nozzle G contacts the fuel liquid surface in the refueling line 1, a well-known automatic stop mechanism is operated to stop the feeding of the fuel from the refueling nozzle G.

When the additional feeding of the fuel is to be conducted after operation of the automatic stop mechanism, the negative pressure is not applied to the diaphragm actuator because of a small flow speed of the fuel passing through the constriction 3, and the internal space in the fuel tank T remains connected to the normally used canister $C_2$.

If the internal pressure in the fuel tank T is increased by the direct rays of the sun during normal operation (i.e., during parking and traveling of the vehicle), the evaporative fuel generated in the fuel tank T is introduced through the charge passage 4, the switch-over valve 5 and the second charge passage $4_2$ into the normally used canister $C_2$.

During traveling of the vehicle after the canisters $C_1$ and $C_2$ have been charged, the first and second purge valves $8_1$ and $8_2$ incorporated respectively in the first and second purge passages $6_1$ and $6_2$ are opened by a command from the electronic control unit U, so that the evaporative fuel purged from the canisters $C_1$ and $C_2$ is fed into the intake passage 7 of the engine and prevented from being released into the atmosphere.

Figure 2:
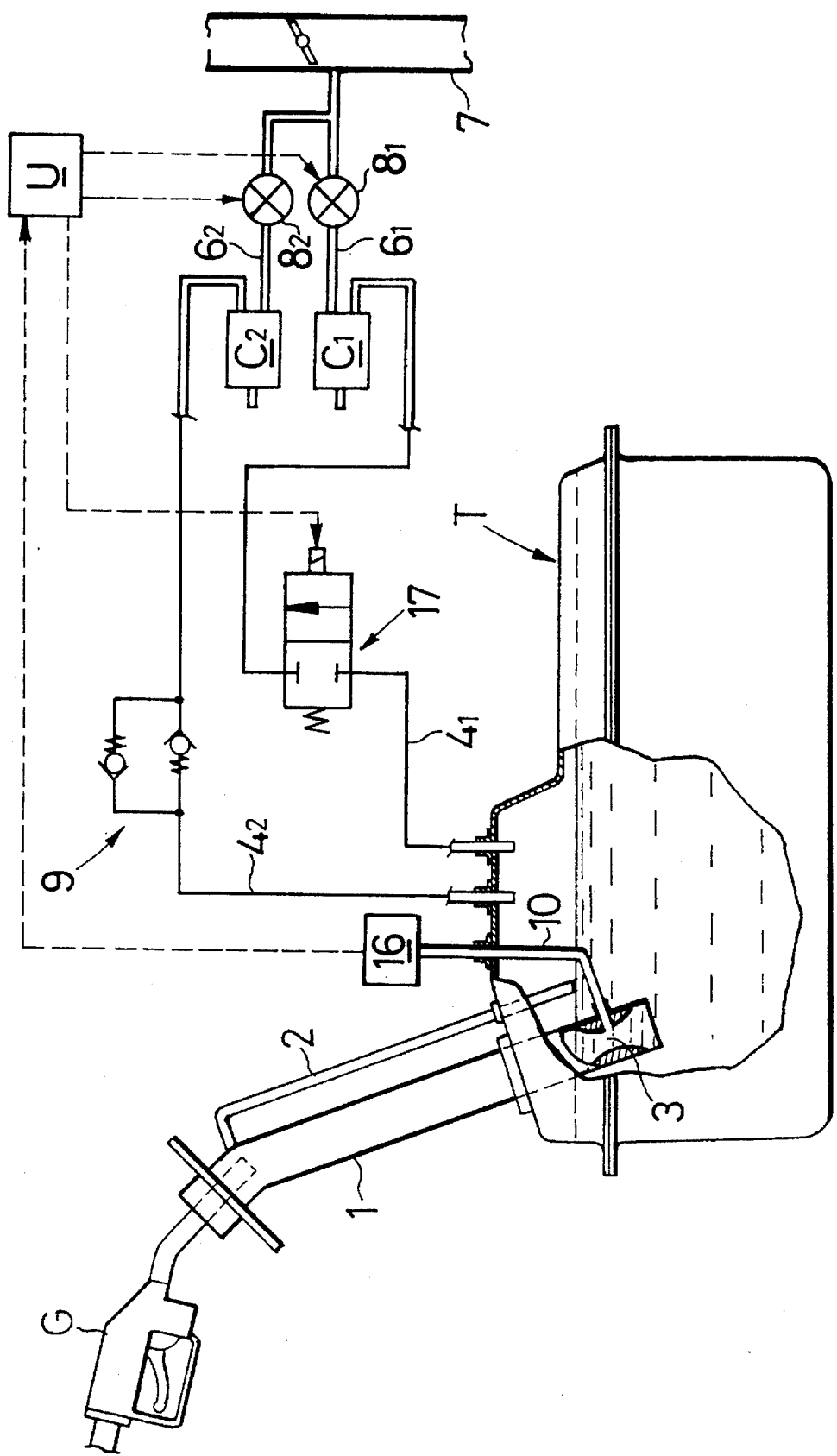
FIG. 2 is a diagrammatic illustration of the entire arrangement of an evaporative fuel processing device according to a second embodiment of the present invention.

A second embodiment of the present invention will now be described in connection with FIG. 2.

A constriction 3 provided in a fuel tank 3, in the second embodiment, is formed by partially reducing the inside diameter of a refueling line 1. The constriction 3 is connected to a pressure sensor 16 through a negative pressure tube 10. The negative pressure tube 10 detects a negative pressure generated at the constriction 3 in the refueling line 1 to supply a signal indicative of the negative pressure to the electronic control unit U. The pressure sensor 16 and the electronic control unit U constitute a control means in the present invention.

A normally closed on-off valve 17 comprising a solenoid valve is incorporated in a first charge passage $4_1$ connecting an internal space in the fuel tank T and a canister $C_1$ used during refueling. The on-off valve 17 is connected to the electronic control unit U and opened when the pressure sensor detects a negative pressure. The internal space in the fuel tank T and a normally used canister $C_2$ are directly connected to each other through a second charge passage $4_2$ with a two-way valve 9 incorporated therein.

The remaining construction of the second embodiment is the same as that of the first embodiment.

If the pressure sensor 16 detects that a negative pressure has been generated at the constriction 3 caused by feeding of the fuel from the refueling nozzle G, the on-off valve 17 is opened by a command from the electronic control unit U. As a result, the evaporative fuel generated in the fuel tank T during refueling is introduced through the on-off valve 17 into the canister $C_1$ used during refueling. During this time, the upper space in the fuel tank T is also in communication with the normally used canister $C_2$, but a large amount of the evaporative fuel generated during refueling is introduced mainly into the canister $C_1$ used during refueling which has a large capacity.

If the fuel liquid level in the fuel tank T reaches the height of the constriction 3, so that the negative pressure disappears, the on-off valve 17 is closed to block the communication between the upper space in the fuel tank T and the canister $C_1$ used during refueling. If the fuel liquid level in the fuel tank T reaches the lower end of the breather tube 2, and the fuel liquid level in the refueling line 1 has risen, the automatic stop mechanism is operated to stop the refueling from the refueling nozzle G.

If the internal pressure in the fuel tank T is increased by the direct rays of the sun during normal operation after completion of the refueling, the evaporative fuel generated is introduced through the second charge passage $4_2$ into the normally used canister $C_2$.

The evaporative fuel introduced into the canisters $C_1$ and $C_2$ is purged into the intake passage 7 of the engine and prevented from being released into the atmosphere by opening of the first and second purge valves $8_1$ and $8_2$ incorporated respectively in the first and second purge passages $6_1$ and $6_2$ during traveling of the vehicle.

Although the embodiments of the present invention have been described in detail, it will be understood that the present invention is not limited to the above-described embodiments, and various modifications may be made without departing from the spirit and scope of the invention defined in the claims.

Figure 3:
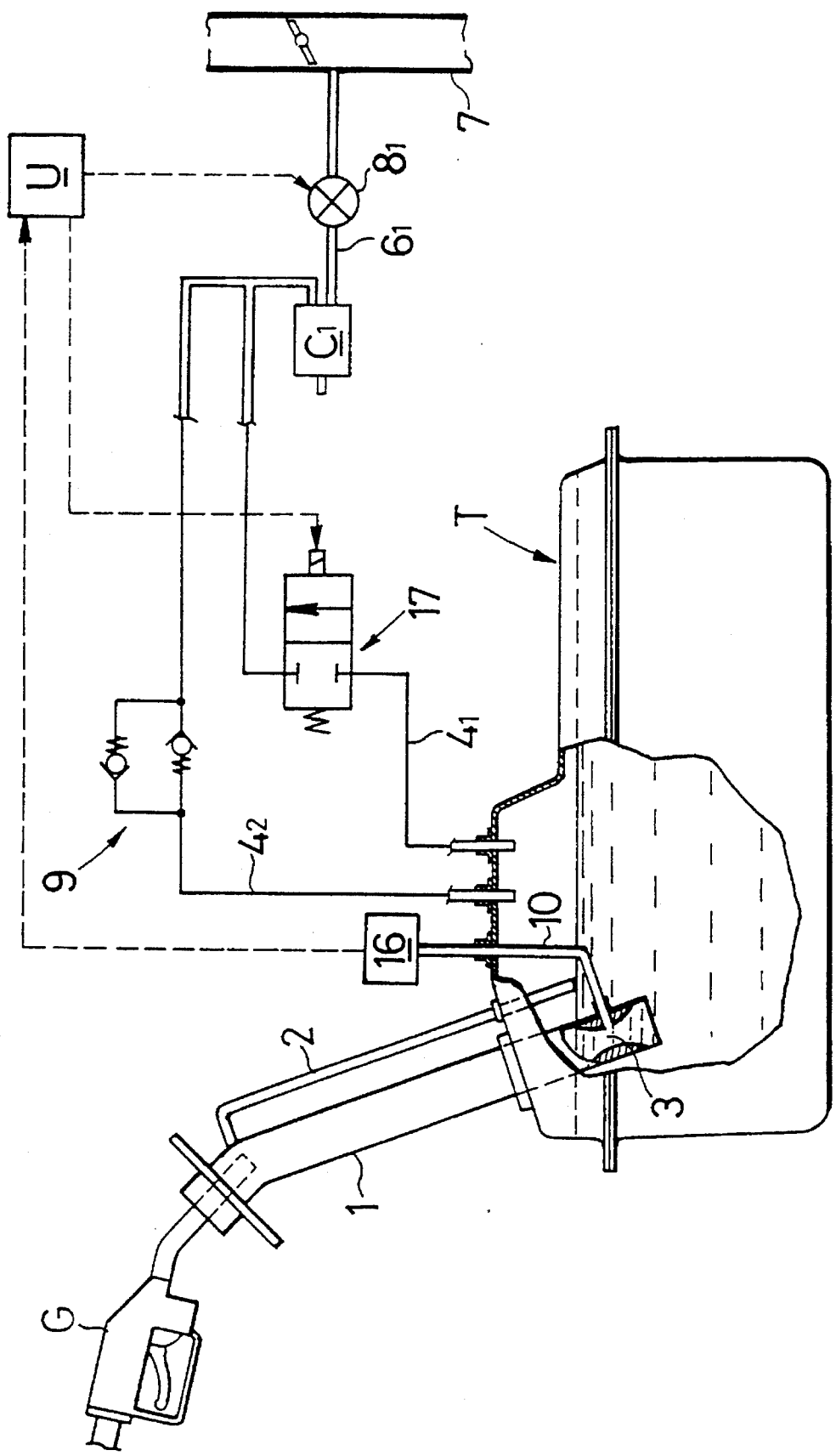
FIG. 3 is a diagrammatic illustration of a refueling canister and an operation canister formed integral with each other.

For example, although the canister $C_1$ used during refueling and the canister $C_2$ used during normal operation have been provided separately, the canisters $C_1$ and $C_2$ may be integral with each other as shown in FIG. 3.

What is claimed is:

1. An evaporative fuel processing device comprising:
a fuel tank;
a refueling line connected to said fuel tank;
a breather tube connecting an upper space in said fuel tank to an upper end of said refueling line for defining an upper limit of the fuel liquid level within said fuel tank;
a constriction provided in said refueling line;
a canister means for adsorbing an evaporative fuel generated in said fuel tank;
a charge passage means for connecting the upper space in said fuel tank to said canister means;
an on-off valve for opening and closing said charge passage means; and
a control means connected to said constriction for opening and closing the on-off valve in accordance with a negative pressure generated at said constriction.

2. An evaporative fuel processing device comprising:
a fuel tank;
a refueling line connected to said fuel tank;
a breather tube connecting an upper space in said fuel tank to an upper end of said refueling line for defining an upper limit of the fuel liquid level within said fuel tank;
a constriction provided in said refueling line;
a refueling canister used during refueling for adsorbing an evaporative fuel generated in said fuel tank;
an operation canister used during normal operation for adsorbing said evaporative fuel generated in said fuel tank;
a first charge passage connected to said refueling canister;
a second charge passage connected to said operation canister;
a switch-over valve which permits said upper space in said fuel tank to selectively communicate with said first charge passage or said second charge passage; and
a control means connected to said constriction for switching said switch-over valve in accordance with a negative pressure generated at said constriction.

3. An evaporative fuel processing device according to claim 1, wherein said constriction is set at a location slightly lower than a lower end of said breather tube.

4. An evaporative fuel processing device according to claim 1, wherein said constriction includes a vertical partition wall in said refueling line which partially decreases a lower flow path sectional area of said refueling line.

5. An evaporative fuel processing device according to claim 1, where said canister means includes a refueling canister used during refueling and an operation canister used during normal operation.

6. An evaporative fuel processing device according to claim 5, wherein said refueling canister and said operation canister are integral with each other.

7. An evaporative fuel processing device according to claim 2, wherein said refueling canister and said operation canister are integral with each other.

8. An evaporative fuel processing device according to claim 1, wherein said canister means includes adsorbents for adsorption of high and low boiling point components.

9. An evaporative fuel processing device according to claim 5, wherein said refueling canister includes adsorbents for adsorption of high boiling point components and said operation canister includes adsorbents for adsorption of low boiling point components.

10. An evaporative fuel processing device according to claim 2, wherein said refueling canister includes adsorbents for adsorption of high boiling point components and said operation canister includes adsorbents for adsorption of low boiling point components.

11. An evaporative fuel processing device according to claim 5, wherein a capacity of said refueling canister is larger than a capacity of said operation canister.

12. An evaporative fuel processing device according to claim 2, wherein a capacity of said refueling canister is larger than a capacity of said operation canister.

13. An evaporative fuel processing device according to claim 1, wherein said canister means is connected to an intake passage of an engine through a purge passage means and purge valve means.

14. An evaporative fuel processing device according to claim 2, wherein said refueling canister and said operation canister are connected to an intake passage of an engine through a purge passage means and a purge valve means.

15. An evaporative fuel processing device according to claim 13, wherein said purge valve means is connected to and controlled for opening and closing by an electronic control unit.

16. An evaporative fuel processing device according to claim 14, wherein said purge valve means is connected to and controlled for opening and closing by an electronic control unit.

17. An evaporative fuel processing device according to claim 1, wherein said control means is a diaphragm actuator including a casing, a diaphragm spread over an opened surface of the casing, a rod slidably carried in a guide member, which is mounted in a bottom wall of the casing, the rod being connected to a center of the diaphragm and a spring mounted under compression between the bottom wall of the casing and the diaphragm.

18. An evaporative fuel processing device according to claim 2, wherein said control means include a pressure sensor and an electronic control unit.

19. An evaporative fuel processing device according to claim 2, wherein said constriction is formed by partially reducing an inside diameter of said refueling line.

20. An evaporative fuel processing device according to claim 2, wherein said switch-over valve permits the upper space in the fuel tank to communicate with both said first and second charge passages during refueling.

* * * * *